United States Patent
Gussner et al.

(10) Patent No.: US 10,369,990 B2
(45) Date of Patent: Aug. 6, 2019

(54) METHOD AND DEVICE FOR AVOIDING OR MITIGATING A COLLISION OF A VEHICLE WITH AN OBSTACLE

(71) Applicant: Robert Bosch GmbH, Stuttgart (DE)

(72) Inventors: Thomas Gussner, Ludwigsburg (DE); Thomas Schlender, Murr (DE); Lutz Buerkle, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 525 days.

(21) Appl. No.: 14/403,494

(22) PCT Filed: Apr. 16, 2013

(86) PCT No.: PCT/EP2013/057873
§ 371 (c)(1),
(2) Date: Nov. 24, 2014

(87) PCT Pub. No.: WO2013/174577
PCT Pub. Date: Nov. 28, 2013

(65) Prior Publication Data
US 2015/0175159 A1    Jun. 25, 2015

(30) Foreign Application Priority Data
May 24, 2012  (DE) .................. 10 2012 208 712

(51) Int. Cl.
*B60W 10/18*  (2012.01)
*B60W 10/20*  (2006.01)
*B60W 30/08*  (2012.01)
*B60W 30/09*  (2012.01)
(Continued)

(52) U.S. Cl.
CPC ............ *B60W 30/09* (2013.01); *B60W 10/18* (2013.01); *B60W 10/184* (2013.01);
(Continued)

(58) Field of Classification Search
CPC .... B60W 30/09; B60W 30/08; B60W 30/095; B60W 30/0956; B60W 10/20;
(Continued)

(56) References Cited

U.S. PATENT DOCUMENTS 6,138,062 A * 10/2000 Usami ................ B62D 15/0265
701/41
7,734,387 B1 * 6/2010 Young ................. G05D 1/0214
701/23
(Continued)

FOREIGN PATENT DOCUMENTS

DE    10036276    2/2002
DE    10114470    9/2002
(Continued)

OTHER PUBLICATIONS

International Search Report for PCT/EP2013/057873, dated Jul. 25, 2013.

*Primary Examiner* — Dale W Hilgendorf
(74) *Attorney, Agent, or Firm* — Norton Rose Fulbright US LLP; Gerard Messina

(57) ABSTRACT

A method is described for avoiding or mitigating a collision of a vehicle with an obstacle in a traffic lane of the vehicle, if the obstacle is at least partially blocking a planned travel envelope of the vehicle, the method including a step of detecting and a step of adapting. In the step of detecting, a position and/or trajectory of the obstacle is detected. In the step of adapting, the travel envelope is adapted with the aid of the position and/or the trajectory, in order to avoid or mitigate the collision.

13 Claims, 7 Drawing Sheets

(51) Int. Cl.
*B62D 15/02* (2006.01)
*B60W 10/184* (2012.01)
*B60W 30/095* (2012.01)
*B60W 50/10* (2012.01)

(52) U.S. Cl.
CPC ............ *B60W 10/20* (2013.01); *B60W 30/08* (2013.01); *B60W 30/095* (2013.01); *B60W 30/0956* (2013.01); *B62D 15/025* (2013.01); *B62D 15/0265* (2013.01); *B60W 50/10* (2013.01); *B60W 2550/10* (2013.01); *B60W 2550/14* (2013.01); *B60W 2550/143* (2013.01)

(58) Field of Classification Search
CPC ............... B60W 10/18; B60W 10/184; B60W 2550/10; B60W 2550/14; B60W 2550/143; B62D 15/025; B62D 15/0265
See application file for complete search history.

(56) References Cited

U.S. PATENT DOCUMENTS

| | | | | |
|---|---|---|---|---|
| 7,778,753 | B2* | 8/2010 | Fujiwara | B60W 10/18 701/301 |
| 2006/0282218 | A1* | 12/2006 | Urai | B60W 30/09 701/301 |
| 2007/0046449 | A1* | 3/2007 | Koike | B60W 30/095 340/435 |
| 2007/0050114 | A1* | 3/2007 | Koike | B60W 30/08 701/45 |
| 2007/0239358 | A1* | 10/2007 | Okazaki | B60W 10/18 701/301 |
| 2008/0061958 | A1* | 3/2008 | Birk | B60W 40/08 340/517 |
| 2008/0097699 | A1* | 4/2008 | Ono | B62D 15/0265 701/300 |
| 2008/0319610 | A1* | 12/2008 | Oechsle | B62D 15/0265 701/41 |
| 2009/0228174 | A1* | 9/2009 | Takagi | B62D 15/0265 701/41 |
| 2010/0191421 | A1* | 7/2010 | Nilsson | B62D 15/025 701/41 |
| 2013/0321172 | A1* | 12/2013 | Igarashi | B60W 30/0956 340/905 |

FOREIGN PATENT DOCUMENTS

| | | |
|---|---|---|
| DE | 102005002760 | 8/2005 |
| EP | 1990786 | 11/2008 |
| WO | WO2008/031662 | 3/2008 |

* cited by examiner

METHOD AND DEVICE FOR AVOIDING OR MITIGATING A COLLISION OF A VEHICLE WITH AN OBSTACLE

FIELD OF THE INVENTION

The present invention relates to a method for avoiding or mitigating a collision of a vehicle with an obstacle, to a corresponding device and a corresponding computer program product.

BACKGROUND INFORMATION

Warning systems and support systems for lane keeping (lane departure warning LDW/lane keeping support LKS systems) which assist the driver of a vehicle in keeping the vehicle within its lane are already available.

For example, German Published Patent Application No. 101 14 470 describes a lane keeping and cruise control device for motor vehicles, which includes a sensor device for detecting a traffic lane, a steering controller for analyzing signals from the sensor device and for outputting steering commands to a steering actuator, as well as a speed controller which acts on the drive system of the vehicle.

SUMMARY

Against this background, the present invention provides a method for avoiding or mitigating a collision of a vehicle with an obstacle, and furthermore a device using this method and finally, a corresponding computer program product.

The present invention is based on the realization that there is frequently still enough room next to an obstacle on the road for an evasive maneuver and for avoiding a collision with the obstacle. In this context a driver assistance system can actively and/or passively influence the lane guidance of a vehicle in order to steer the vehicle through a corridor along the side of the obstacle.

The present invention provides a method for avoiding or mitigating a collision of a vehicle with an obstacle located in a traffic lane of the vehicle if the obstacle at least partially blocks a planned travel envelope of the vehicle. The method has the following steps:

Detecting a position and/or trajectory of the obstacle; and adapting the travel envelope with the aid of the position and/or the trajectory in order to avoid or mitigate the collision.

An obstacle could be a moving or a stationary object. The obstacle extends in a space or an area in front of a moving vehicle through which the moving vehicle would pass without path correction, and which would cause the vehicle to crash into the obstacle. For example, the obstacle may be another vehicle, especially an oncoming vehicle. However, the obstacle may also be a branch jutting into the roadway, for instance. A traffic lane describes a road section for a vehicle on a road, and may be identified by lane markings. A roadway may have multiple traffic lanes situated next to each other. The traffic lane may be the lane in which the vehicle is currently driving. A travel envelope may be understood to describe a virtual path which is ascertained for the vehicle guidance and along which the vehicle is expected to travel in order to stay within the traffic lane. The travel envelope can be predefined by a lane keeping system in the vehicle. A position and/or trajectory of the obstacle may represent dimensions and the location of the obstacle and, in the case of a moving obstacle, the movement direction and movement speed of the obstacle. An adaptation means a modification.

The travel envelope is able to be shifted into a direction that faces away from the obstacle and may be shifted away from the obstacle until the obstacle no longer blocks the travel envelope. In this way the vehicle is able to pass the obstacle without touching it.

Within a certain tolerance tolerance range, an edge of the travel envelope facing the obstacle may be shifted to an edge of the obstacle facing the vehicle. The travel envelope is able to guide the vehicle just barely past the obstacle without the vehicle touching the object. If no space is available otherwise, the travel envelope can also be guided so closely toward the obstacle that, for example, an outside mirror of the vehicle touches the obstacle.

A width of the travel envelope can be reduced to a width of the vehicle. In an extreme situation, the vehicle without the outside mirror may be considered in the width of the vehicle. Reducing the width of the travel envelope makes it possible for the vehicle to pass the vehicle although the travel envelope previously could not lead past the obstacle without a collision.

The travel envelope is adaptable within a traffic space, the traffic space including the traffic lane and a region that had been detected as drivable in the detection step and extends beyond a boundary of the traffic lane facing away from the obstacle. If insufficient space is available for the travel envelope next to the obstacle, it is possible to enlarge the available space for the travel envelope. For example, portions of an adjacent traffic lane may be utilized, provided this traffic lane is not occupied.

The region may be detected as drivable even if an object that is classified as belonging to a predefined obstacle class is noticed in the region. A predefined obstacle class may be a category of obstacles that would cause only minor or no damage in a collision. For example, the object may be a road marker post or the area may be overgrown with grass or shrubbery, through which the vehicle can pass easily. In this way it is possible to choose the lesser evil while avoiding more serious damage.

The traffic space may be enlarged along the side to extend up to the roadway edge. For instance, the traffic space may then include the shoulder of the traffic lane. The shoulder may then already provide sufficient space to avoid a collision.

The traffic space can be enlarged beyond the edge of the road. For example, it is possible to use the unpaved side-strip next to the traffic lane for the travel envelope.

The traffic space may be enlarged along the side until it abuts a further obstacle and/or a protective device. For example, it may be enlarged up to a guardrail. It is also possible that the vehicle touches the guardrail in a controlled manner in order to mitigate or prevent the collision. Material damage may be acceptable in this case without risking personal injury.

The method may include a step of providing a delay signal for the vehicle. The delay signal is able to be provided with the aid of the position and/or the trajectory in order to avoid or mitigate the collision. A delay signal can initiate braking of the vehicle to reduce an impact speed of the vehicle against the obstacle, and/or to improve the maneuverability of the vehicle.

The delay signal can be supplied until the vehicle has come to a stop. In this way the vehicle is able to be checked for damage to the vehicle right away in case of a minor collision.

Advantageous is also a specific embodiment of the present invention, in which a step of detecting is provided as to whether a driver of the vehicle is evading the obstacle, and in the step of adapting the travel envelope, at least one modification or an adaptation of the travel envelope is suppressed completely if it is discovered in the detection step that the driver of the vehicle is evading the obstacle. Such a specific embodiment of the present invention offers the advantage that the driver behavior is able to be taken into account in an especially optimal manner, so that the driver assistance system irritates or startles a driver as little as possible or not at all in the course of driving.

The present invention furthermore creates a device which is developed to carry out or implement the steps of the method according to the present invention in corresponding devices. This embodiment variant of the present invention in the form of a device may likewise be used to quickly and efficiently achieve the object on which the present invention is based.

In the case at hand, a device is an electrical device, which processes sensor signals and outputs control signals and/or data signals as a function thereof. The device may include an interface developed as hardware and/or software. In a hardware implementation, the interfaces may be part of a so-called system ASIC, for instance, which encompasses a wide variety of functionalities of the device. However, it is also possible for the interfaces to be self-contained, integrated switching circuits or to be at least partially made up of discrete components. In a software design, the interfaces may be software modules which are provided in a microcontroller in addition to other software modules, for example.

Also advantageous is a computer program product which has program code that may be stored on a machine-readable carrier such as a semiconductor memory, a hard-disk memory or an optical memory, and which is able to be used to implement the method according to one of the specific embodiments described above when the program product is run on a computer or a device.

DETAILED DESCRIPTION

Figure 1:
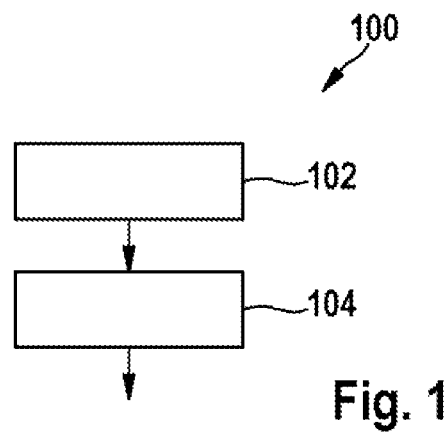
FIG. 1 a block diagram of a method for avoiding or mitigating a collision of a vehicle with an obstacle, according to an exemplary embodiment of the present invention.

In the following description of preferred exemplary embodiments of the present invention, the same or similar reference numerals are used for the elements that are shown in the various figures and act similarly, and a repeated description of these elements has been omitted.

FIG. 1 shows a flow chart of a method 100 for avoiding or mitigating a collision of a vehicle with an obstacle according to an exemplary embodiment of the present invention. Method 100 has a step 102 of detecting and a step 104 of adapting. The obstacle is located in front of the vehicle in a traffic lane of the vehicle and blocks at least part of a planned travel envelope of the vehicle. The travel envelope has been ascertained by a driver assistance system based on environmental information. Using the traffic lane, the planned travel envelope guides the vehicle inside the traffic lane, without straying from it. In the step of detecting 102, the obstacle as well as a position and, alternatively or additionally, a trajectory of the obstacle are detected in the surroundings information. In step of adapting 104, the travel envelope is adapted with the aid of the position and/or the trajectory, in order to avoid or mitigate the collision. For example, the travel envelope may be shifted within the traffic lane toward an edge of the traffic lane facing away from the obstacle, provided sufficient space is available for the vehicle between the edge and the obstacle. In addition, a speed of the vehicle may be reduced. If the space between the obstacle and the edge of the traffic lane is insufficient, then a region adjacent to the traffic lane may be used for shifting the travel envelope. To do so, the region must be detected as drivable and be added to an available traffic space. For example, an adjacent traffic lane may be shared, provided there is free space next to the obstacle. In the same way, an adjacent shoulder of the road may be used, which is usually not part of the traffic lane. If there is still not enough room next to the obstacle, then the area may also be expanded to include the unpaved shoulder, provided the unpaved shoulder is detected as drivable. In this way the vehicle is able to evade even obstacles that project far into the own traffic lane. If the lateral expansions of the road space still do not provide enough space next to the obstacle, then braking may be initiated as well, so that the vehicle is brought to a stop before the obstacle.

In other words, FIG. 1 shows an expansion of an LDW/LKS bottleneck assistant. In addition to a conventional lane keeping assistant, the approach introduced here considers whether conflicts with the oncoming traffic may arise. It is also taken into account whether free space of adequate size is still available next to the (marked) traffic lane that may be used for avoiding a collision with the oncoming traffic.

The approach described here introduces a method 100 for avoiding a collision with oncoming traffic (or another obstacle on the road) and for supporting the driver at bottlenecks.

Figure 2:
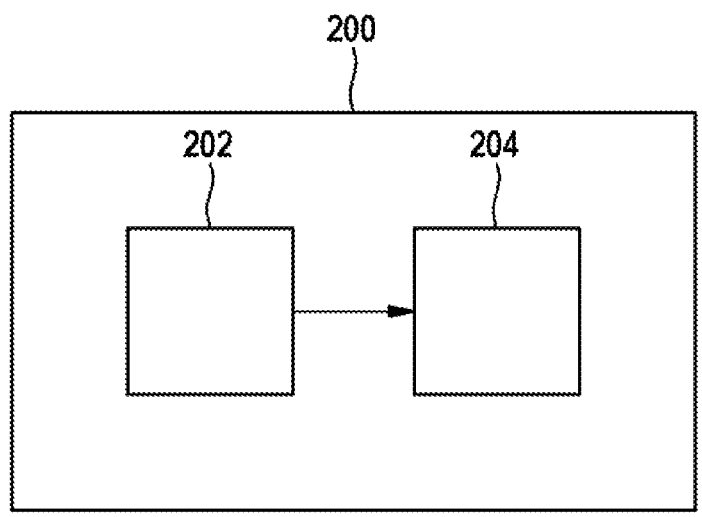
FIG. 2 a block diagram of a device for avoiding or mitigating a collision of a vehicle with an obstacle, according to an exemplary embodiment of the present invention.

FIG. 2 shows a block diagram of a device 200 for avoiding or mitigating a collision of a vehicle with an obstacle according to an exemplary embodiment of the present invention. Device 200 is designed to execute a method as described in FIG. 1. Device 200 includes a device for detecting 202 and a device for adapting 204. The device for detecting 202 is designed to detect a position and/or trajectory of the obstacle within a traffic lane of the vehicle if the obstacle at least partially blocks a planned travel envelope of the vehicle. To do so, device 202 is able to access surroundings information about an environment of the vehicle. The device for adapting 204 is designed to adapt the travel envelope, using the position and/or the trajectory, in order to avoid or mitigate the collision.

Multiple combinable developments are introduced.

Figure 3:
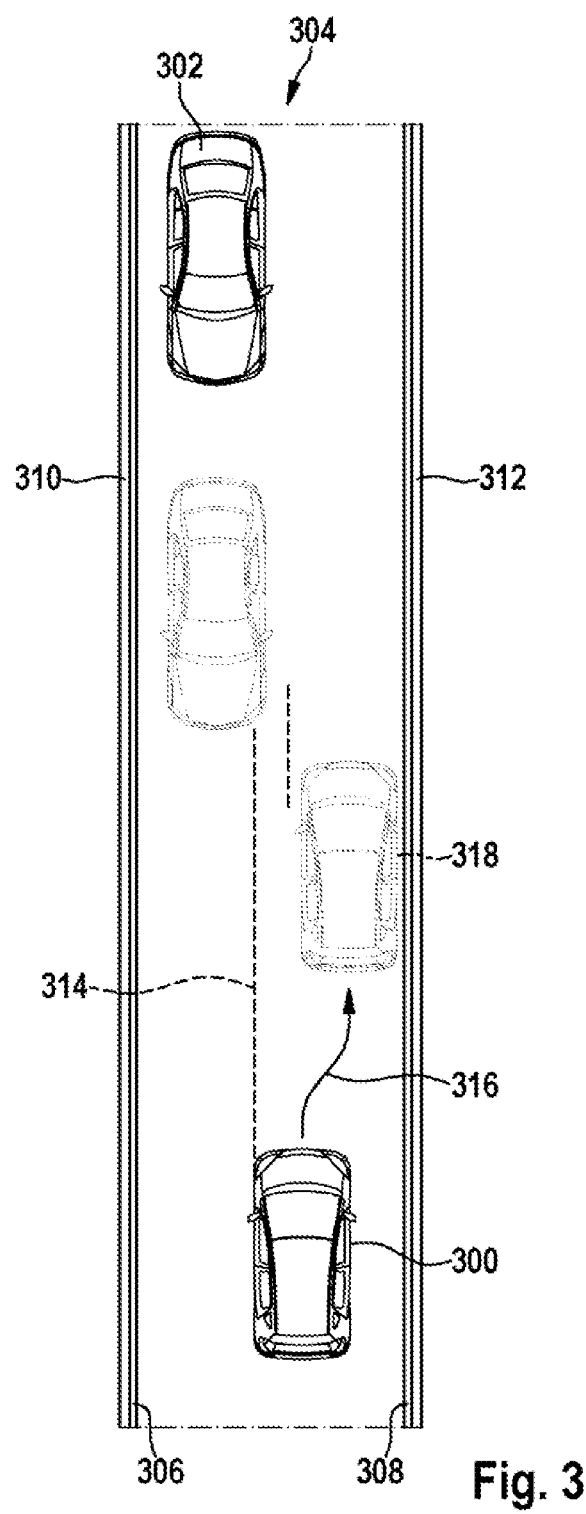
FIG. 3 an illustration of a first traffic situation in which a method for avoiding or mitigating a collision of a vehicle with an obstacle is used, according to an exemplary embodiment of the present invention.

FIG. 3 illustrates a first traffic situation in which a method for avoiding or mitigating a collision of a vehicle 300 with an obstacle 302 according to an exemplary embodiment of the present invention is used. In this exemplary embodiment, obstacle 302 is an oncoming vehicle 302. Vehicle 300 and oncoming vehicle 302 travel in opposite directions on an undivided roadway having two solid roadway delimitation lines 306, 308 along the sides. A shoulder 310, 312 abuts roadway delimitation lines 306, 308 on each side. The traffic lane and shoulders 310, 312 are paved and may therefore be used without restriction. Keeping to the right of the road, unless passing, is mandatory in the exemplary embodiment. When viewed in the driving direction in each case, both vehicles 300, 302 have a clearance from roadway delimitation lines 306, 308 on the right side that is less than on the left side. If both vehicles 300, 302 were to maintain their original distance from the right roadway delimitation lines 306, 308, vehicles 300, 302 would collide with each other head-on at an offset. An extension 314 of a left outer edge of vehicle 300 overlaps a left outer edge of oncoming vehicle 302.

Vehicle 300 is equipped with a device for avoiding or mitigating a collision with an obstacle according to a specific embodiment of the present invention, as described in FIG. 2. The accident risk caused by the overlap of the left outer edges is detected, and an intended travel envelope of vehicle 300 is adapted as a result. The intended travel envelope represents a corridor within which vehicle 300 is able to follow a course of the traffic lane. In a warning against leaving the travel envelope, for example, a warning tone may sound for a driver of the vehicle. In the exemplary embodiment illustrated here, there is sufficient room between right roadway delimitation line 308 and the left outer edge of oncoming vehicle 302 to pass oncoming vehicle 302 without a collision. It is therefore possible to shift a side of the travel envelope that is facing away from the obstacle to a side of the traffic lane that faces away from the obstacle. In this instance the side of the traffic lane facing away from the obstacle corresponds to right roadway delimitation line 308. As an alternative or in addition, an obstacle-facing side of the travel envelope, which in this case is the left outer edge of vehicle 300, may be shifted toward a vehicle-facing side of obstacle 302, i.e., the left outer edge of oncoming vehicle 302 in this instance, while maintaining a specified tolerance range. With the aid of adapted travel envelope 316, a driver of vehicle 300 is assisted in avoiding the looming collision. Because the driver does not depart from travel envelope 316 in the evasive maneuver, no LDW warning or no LKS intervention is output despite the fact that roadway delimitation line 308 is crossed. If the driver appears to be leaving travel envelope 316 on the side that is facing the obstacle, it is possible to transmit triggers to the driver via a steering wheel of vehicle 300, which guide the driver within the travel envelope, so that the driver steers vehicle 300 to an evasive position 318.

A conventional LDW/LKS system can be switched off or modified in its parameters if it is detected that the driver evades oncoming traffic 302 at a bottleneck. The LDS/LKS system is switched off or the warning/control region is expanded in the direction of roadway edge 312. In this way the driver will not be irritated by the LDS/LKS system when encountering a bottleneck featuring oncoming traffic 302 or be hampered in an effort to evade oncoming traffic 302. Ideally, the driver is able to avoid the collision with oncoming traffic 302 through his or her evasive maneuver without further subsequent damage.

Especially at bottlenecks, the assistance system introduced here can support the driver in staying to the right as much as possible. This may be accomplished in optical, haptic or acoustic form or in any combination thereof, and/or by active steering interventions. In parallel therewith, the speed may be reduced if warranted. This development may be referred to as right-hand driving assistance for right-hand traffic, or as left-hand driving assistance in left-hand driving.

A bottleneck need not necessarily be caused by construction, but may also result dynamically, for instance because of oncoming traffic 302 that is driving too close to the center or is driving in the own vehicle's traffic lane.

In a controlled heading for traffic lane edge 312 on account of oncoming traffic 302 (or a rigid obstacle in the traffic lane), the driver will not be irritated or hampered by the behavior of an LDW/LKS system at a bottleneck.

A collision with oncoming traffic 302 (or a rigid obstacle on the road) at bottlenecks is able to be prevented if the driver is assisted in using the full width of the traffic lane.

The assistance system can help the driver in driving as far to the right as possible, especially at bottlenecks. This may be accomplished in optical, haptic or acoustic form or in any random combination thereof, and/or by active interventions in the vehicle movement (such as steering interventions).

If the preconditions are satisfied, the LDW/LKS system is fully or partially deactivated or the warning/control region is expanded in the direction of roadway edge 312 when oncoming traffic 302 (or a rigid obstacle) is detected in the own travel envelope with which a collision will occur at a probability that is greater than W1. The reactivation takes place if no relevant object is situated in the travel envelope any longer or the probability that a collision will occur is less than W2 (i.e., W2≤W1).

Figure 4:
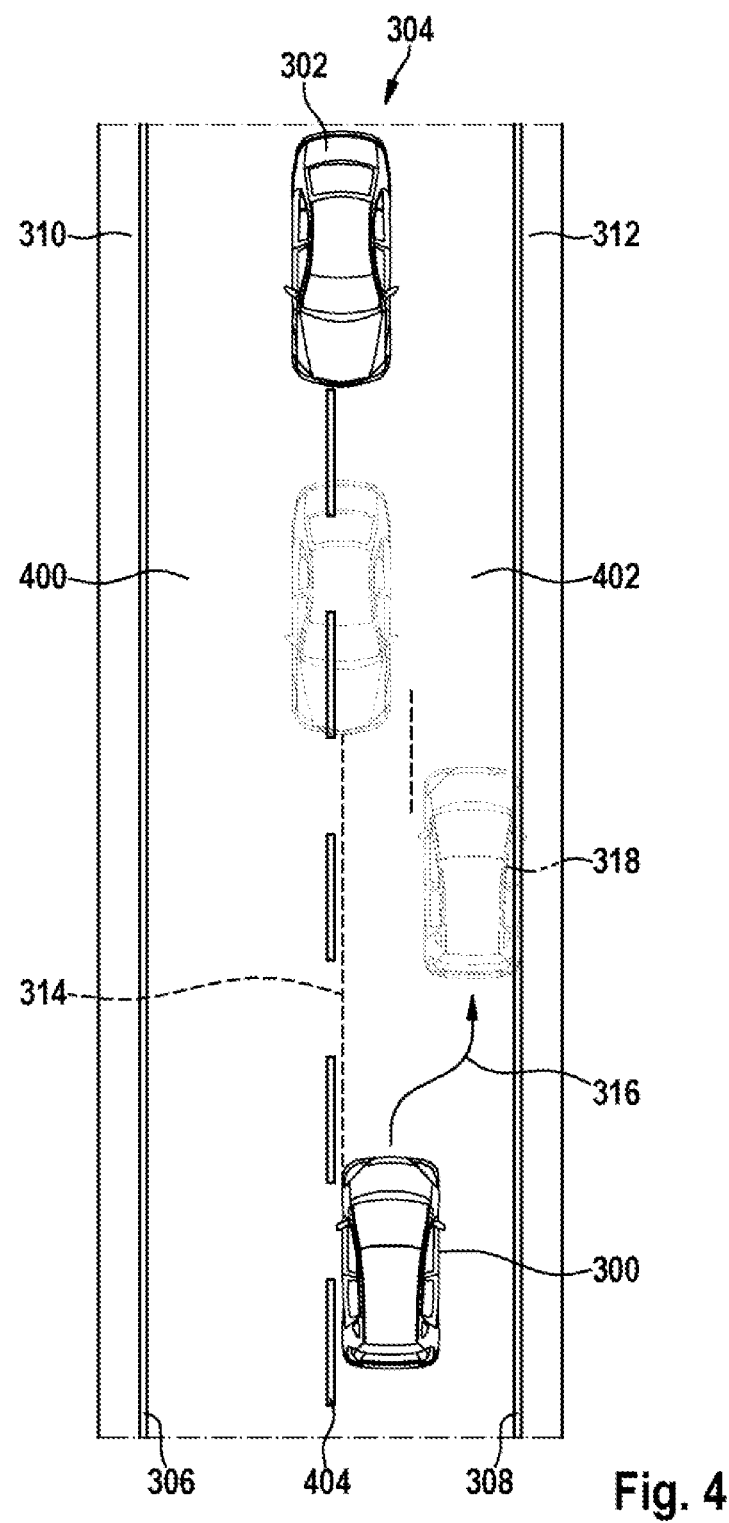
FIG. 4 an illustration of a second traffic situation in which a method for avoiding or mitigating a collision of a vehicle with an obstacle is used, according to an exemplary embodiment of the present invention.

FIG. 4 illustrates a second traffic situation in which a method for avoiding or mitigating a collision of a vehicle 300 with an obstacle 302 according to an exemplary embodiment of the present invention is used. The traffic situation resembles the traffic situation in FIG. 3. In contrast to FIG. 3, roadway 304 has a first directional lane 400 for a first travel direction and a second directional lane 402 for an opposite second travel direction. A boundary between directional lanes 400, 402 is denoted by a lane separation line 404. In addition, shoulders 310, 312 are broader than in FIG. 3. Vehicle 300 is traveling on second directional traffic lane 402. Oncoming vehicle 302 is driving too far to the left and partially projects beyond lane separation line 404. As a result, oncoming vehicle 302 partially blocks second directional traffic lane 402. Second directional traffic lane 402 provides insufficient room for vehicle 300. The extension of outer edge 314 of vehicle 300 virtually points to the center of the oncoming vehicle. Since right shoulder 312 is detected as suitable for driving, travel envelope 316 is shifted beyond right roadway delimitation line 308 and onto right shoulder 312 in this exemplary embodiment. When using shoulder 312, sufficient space for vehicle 300 is available once again. Vehicle 300 is able to be guided into evasive position 318, and the looming collision can be avoided.

At bottlenecks featuring oncoming traffic 302, it may be advantageous to depart from traffic lane 402 in the right direction in an effort to avoid a collision with oncoming traffic 302. A conventional LDW-LKS system may be deactivated/reconfigured in its parameters for this purpose.

If the preconditions are satisfied, an activation takes place when oncoming traffic 302 (or a rigid obstacle) is detected in the own travel envelope, with which a collision will take place at a probability that is greater than W3. The deactivation takes place if no relevant object is located in the travel envelope any longer or the probability of a collision is less than W4 (i.e., W4≤W3).

Figure 5:
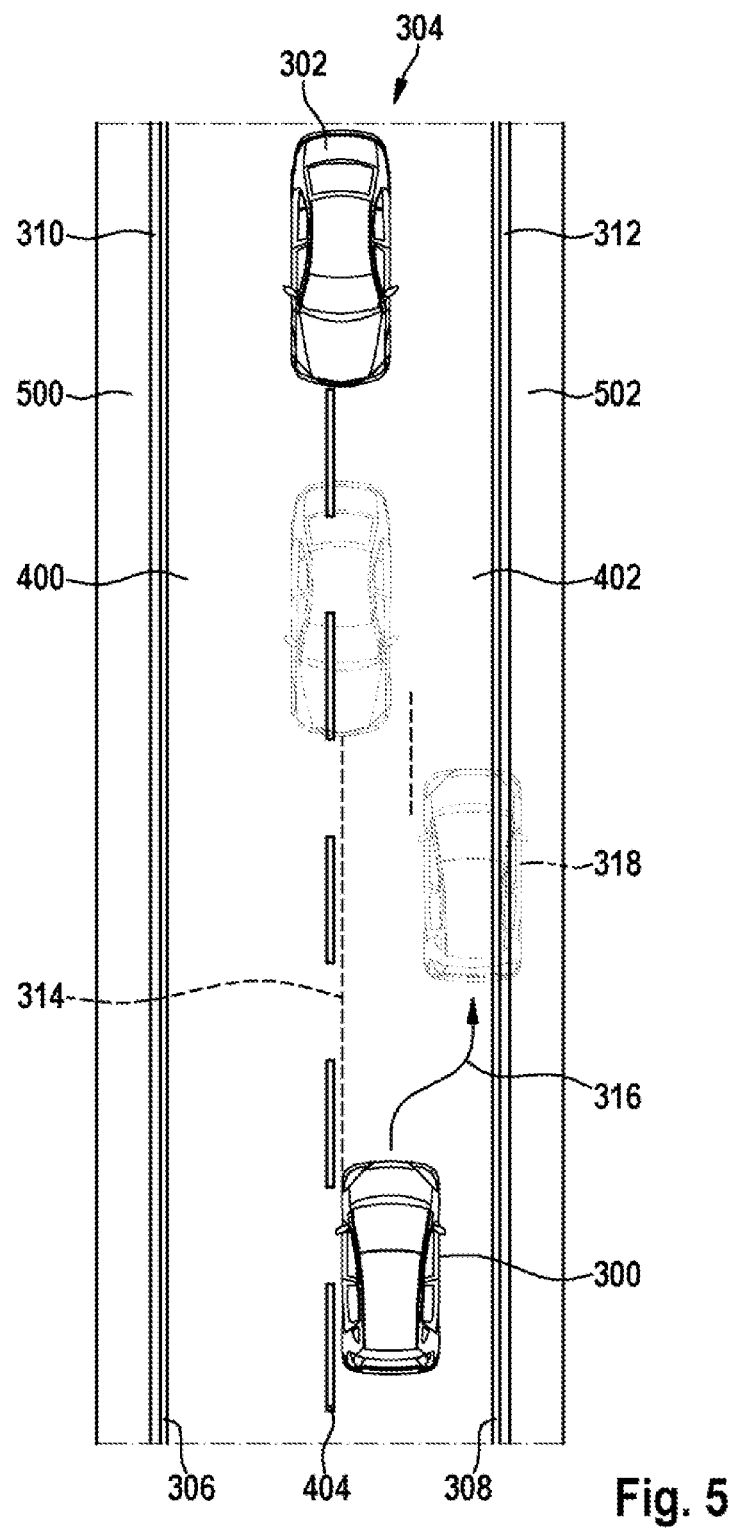
FIG. 5 an illustration of a further traffic situation in which a method for avoiding or mitigating a collision of a vehicle with an obstacle is used, according to an exemplary embodiment of the present invention.

FIG. 5 illustrates a view of a further traffic situation in which a method for avoiding or mitigating a collision of a vehicle 300 with an obstacle 302 according to an exemplary embodiment of the present invention is used. The illustrated traffic situation corresponds to the traffic situation in FIG. 4. In contrast to FIG. 4, traffic lane 304 is narrower. Paved shoulders 310, 312 are as narrow as in FIG. 3. A strip 500, 502, which is unpaved yet drivable, abuts shoulders 310, 312. Because there is little space for vehicle 300 on traffic lane 402 in this case as well, the edge of travel envelope 316 facing away from the obstacle is shifted up to unpaved strip 502. This makes it possible to avoid the looming accident with its unpredictable consequences. In some instances paved strips 500, 502 have guide posts. Guide posts constitute an obstacle. However, colliding with a guide post will most likely cause less damage than a front-end impact against oncoming vehicle 302. For this reason unpaved side strip 502 can be classified as drivable, even if a guide post may be run over in the process.

As a further development, the assistance system introduced here may identify shoulder 312 (to which edge line 308 belongs as well) and also unpaved strip 502 (if present) as a (partially) drivable area adjacent to traffic lane 304 and actively utilize it in a selective manner in order to avoid a collision with oncoming traffic 302 (or a rigid obstacle within the traffic lane). In parallel therewith, the speed may be reduced if warranted. In certain cases, collisions with "minor" obstacles, such as guide posts may even be allowed if this makes it possible to avoid collisions with oncoming traffic 302 or a rigid obstacle. In addition, the process may be video-recorded in order to justify the system behavior retroactively.

A collision with oncoming traffic 302 (or a rigid obstacle in the traffic lane) at bottlenecks can be avoided if an available drivable region adjacent to traffic lane 402 (shoulder 312) or adjacent to traffic lane (unpaved side strip) 502 is used in addition.

If the preconditions are satisfied, an activation takes place if oncoming traffic 302 (or a rigid obstacle) is detected in the own travel envelope with which a collision will take place at a probability that is greater than W5. The deactivation takes place if no relevant object is located in the travel envelope any longer or if the probability of a collision is less than W6 (W6≤W5).

Probabilities W1, W2, W3, W4, W5, and W6 may be defined in the system setup.

The active use of shoulder 312 and, optionally, unpaved side strip 502 is suitable only in extreme cases, when the remaining usable traffic lane width at this location is indeed too narrow for own vehicle 300 (due to the lateral position of oncoming traffic 302). The use should depend on whether room is still available outside of traffic lane 402 (such as a sufficiently large shoulder 312 or a sufficiently large unpaved side strip 502), which may be utilized to avoid a collision with oncoming traffic 302 or a rigid obstacle in traffic lane 304. This may be accomplished through active interventions in the vehicle movement (such as steering interventions).

Under no circumstances must vehicle 300 be steered toward a pedestrian, down a slope, or against a tree/post in the process. In general, this functionality may not create an additional danger.

Preconditions are a sufficiently reliable and sufficiently detailed detection (by means of a surroundings sensor system) of the traffic lane width, roadway delimitation line 308, roadway boundary, the width, speed, lateral position and movement direction of the oncoming vehicle, the lateral position (in relation to the traffic lane delimitation) and the movement direction and width of own vehicle 300 and additionally, the roadway environment, i.e., the development and characteristics of the road edge (curb, ditch, tree, post, etc.) for the "active use of shoulder 312 and optionally, of unpaved side strip 502" functionality.

The approach presented here is able to be implemented for all passenger cars equipped with a corresponding surroundings sensor system and possibly an actuator system (such as for steering interventions).

Figure 6:
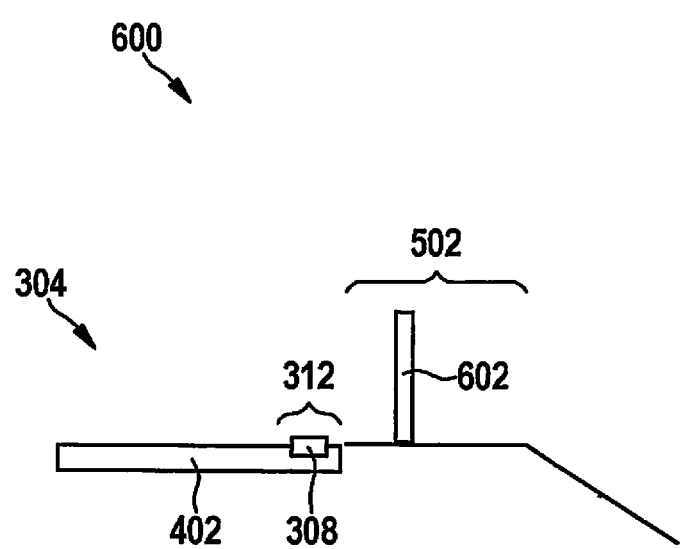
FIG. 6 an illustration of a part of a road cross-section.

FIG. 6 shows an view of a portion of a road cross section 600 in order to illustrate the additionally usable spaces in a method for avoiding or mitigating a collision according to an exemplary embodiment of the present invention. Road cross section 600 is shown in simplified form and shows no underpinning of the road. Illustrated is a portion of right traffic lane 402 as well as shoulder 312 as components of roadway 304. Roadway delimitation line 308 denotes the boundary of shoulder 312. An area of roadway delimitation line 308 is part of shoulder 312. Right unpaved side strip 502 is adjacent to right shoulder 312. A guide post 602 is shown on unpaved side strip 502. As a rule, guide post 602 is set apart from the right edge of traffic lane 402 by 50 cm. Unpaved side strip 502 extends beyond guide post 602 and transitions to an embankment of the road.

Figure 7:
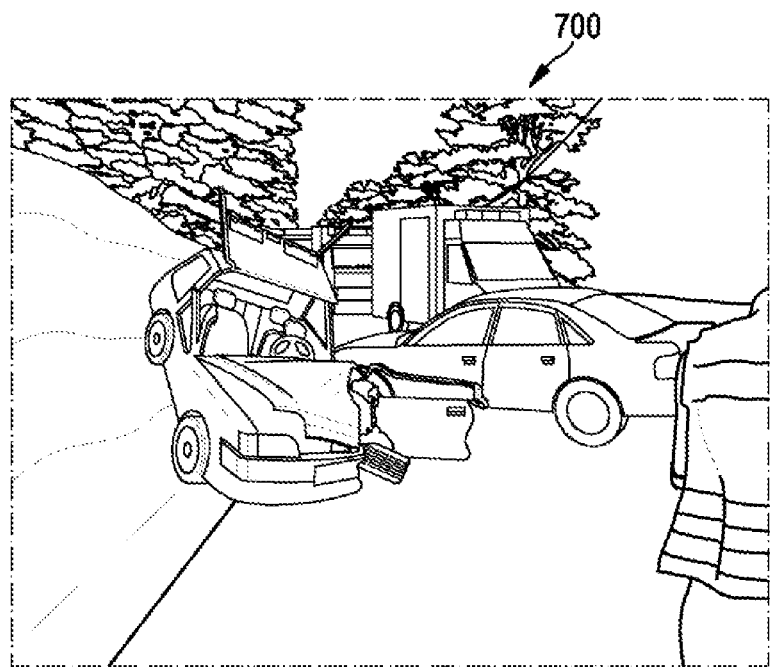
FIG. 7 an illustration of an accident situation on a road without traffic lane markings and without use of a method for avoiding or mitigating a collision.

FIG. 7 shows an illustration of an accident situation 700 on a road 702 without traffic lane markings and without use of a method for avoiding or mitigating a collision. As an example, FIG. 7 shows a traffic situation 700 on a narrow road 702 (4.50 m), which is broad enough, however, to allow two passenger vehicles to pass each other. The silver-colored vehicle drove too far to the left, so that a collision with oncoming traffic occurred. The accident could have been avoided if the silver-colored vehicle had driven closer to the right side.

Figure 8:
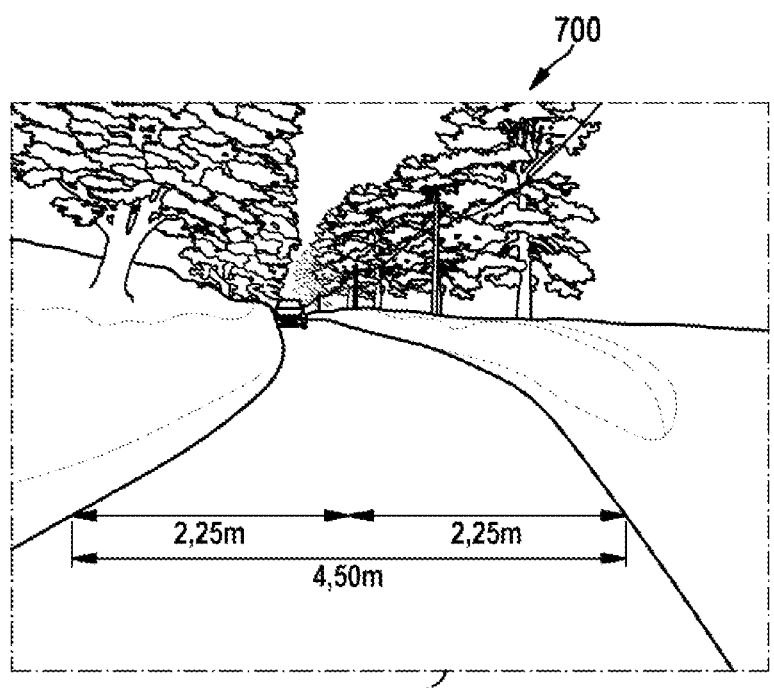
FIG. 8 an illustration of a road without traffic lane markings at the location of the accident.

FIG. 8 shows a view of road 702 without roadway markings at the accident location of FIG. 7. Roadway 702 has a width of 4.50 m. A width of 2.25 m thus was available to each of the two vehicles. Since the right and left unpaved side strips of road 702 have a rising slope, driving on the unpaved side strips is possible only to a limited extent. However, a slight gain in space would have been possible in an emergency situation.

Figure 9:
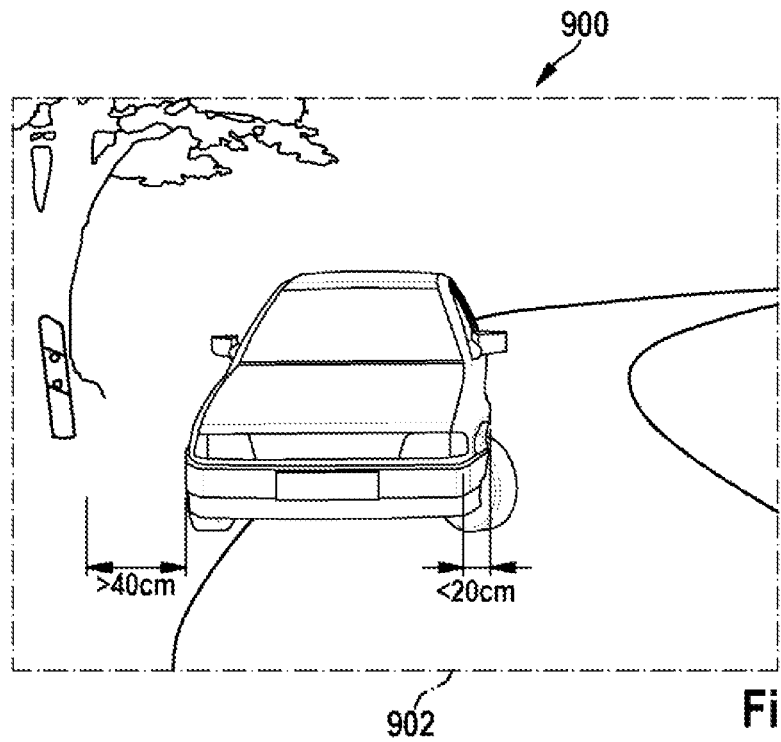
FIG. 9 an illustration of another accident situation on a road without traffic lane markings and without use of a method for avoiding or mitigating a collision.

FIG. 9 shows an illustration of a further accident situation 900 on a road 902 without traffic lane markings and without use of a method for avoiding or mitigating a collision. On a left side, a vehicle shows traces of an accident that cover an area of less than 20 cm. To the right of the vehicle, more than 40 cm would have been available as potential evasion region on the unpaved side strip of road 902. The accident could have been avoided if the vehicle had driven closer to the right.

Figure 10:
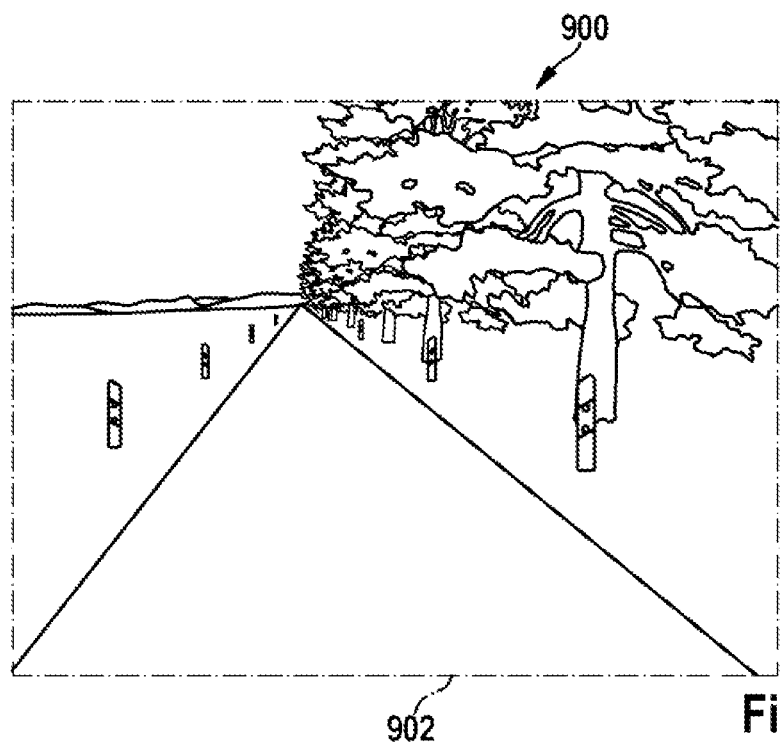
FIG. 10 an illustration of a road without traffic lane markings at the location of the further accident.

FIG. 10 shows a view of road 902 without roadway markings at the location of the further accident. As an example, FIG. 10 shows a narrow road 902 which features a level meadow with guide posts situated approximately up to 50 cm beyond the roadway. In one direction, road 902 has trees which start approximately 50 cm to the right. A collision at a slight overlap (<20 cm) took place. The area of the unpaved side strip directly adjacent to the roadway and up to the guide posts provides sufficient width in this case, so that the collision could have been avoided if an assistance system according to an exemplary embodiment of the present invention had utilized this area (in part).

The exemplary embodiments described and shown in the figures have been selected merely as examples. Different exemplary embodiments are combinable with one another, either completely or with regard to individual features. An exemplary embodiment may also be supplemented by features from another exemplary embodiment.

Furthermore, method steps according to the present invention may be carried out repeatedly and also performed in a sequence other than the one described.

If an exemplary embodiment includes an "and/or" linkage between a first feature and a second feature, this may be understood to mean that the exemplary embodiment according to one specific embodiment has both the first feature and the second feature, and according to another specific embodiment, either has only the first feature or only the second feature.

What is claimed is:

1. A method for one of avoiding and mitigating a collision of a vehicle with an obstacle in a traffic lane of the vehicle, the method comprising:
    generating, by a computing device, a planned travel envelope that represents a predetermined corridor within which the vehicle is to travel, the predetermined corridor having a first side and a second side;
    after generating the travel envelope:
        detecting at least one of a position and a trajectory of the obstacle, and
        adapting the travel envelope by shifting at least one of the sides of the predetermined corridor of the travel envelope with the aid of the at least one of the position and the trajectory in order to one of avoid and mitigate the collision, wherein the step of adapting includes adapting the travel envelope within a traffic space, the traffic space including a traffic lane and an area that is detected as drivable in the step of detecting, and which goes beyond a boundary of the traffic lane that is facing away from the obstacle; and
    automatically controlling the vehicle in accordance with the adapted travel envelope.

2. The method as recited in claim 1, wherein the shifting of the least one of the sides is in a direction that is facing away from the obstacle.

3. The method as recited in claim 2, wherein the step of adapting includes shifting a side of the corridor facing the obstacle toward an edge of the obstacle facing the vehicle within a certain tolerance range.

4. The method as recited in claim 1, wherein the step of detecting detects the area as drivable even if an object is detected in the area that is classified as belonging to a predefined obstacle class.

5. The method as recited in claim 1, wherein the step of adapting includes laterally expanding the area up to an edge of a roadway.

6. The method as recited in claim 1, wherein the step of adapting includes expanding the traffic space beyond an edge of a roadway.

7. The method as recited in claim 1, wherein the step of adapting includes laterally expanding the area up to at least one of a further obstacle and a protective device.

8. The method as recited in claim 1, further including supplying a delay signal for the vehicle using the at least one of the position and the trajectory, in order to one of avoid and mitigate the collision.

9. The method as recited in claim 8, wherein the step of supplying includes supplying the delay signal until the vehicle comes to a standstill.

10. The method as recited in claim 1, further comprising detecting whether a driver of the vehicle is evading the obstacle, wherein the step of adapting the travel envelope includes suppressing completely at least one of a modification and an adaptation of the travel envelope if it is detected that the driver of the vehicle is evading the obstacle.

11. A method for one of avoiding and mitigating a collision of a vehicle with an obstacle in a traffic lane of the vehicle, the method comprising:
    generating, by a computing device, a planned travel envelope that represents a predetermined corridor within which the vehicle is to travel, the predetermined corridor having a first side and a second side; and
    after generating the travel envelope:
        detecting at least one of a position and a trajectory of the obstacle, and
        adapting the travel envelope by shifting at least one of the sides of the predetermined corridor of the travel envelope with the aid of the at least one of the position and the trajectory in order to one of avoid and mitigate the collision, wherein the step of adapting includes reducing a width of the travel envelope to a width of the vehicle; and
    automatically controlling the vehicle in accordance with the adapted travel envelope.

12. A device for one of avoiding and mitigating a collision of a vehicle with an obstacle in a traffic lane of the vehicle comprising:
    an arrangement including a computing device for generating a planned travel envelope that represents a predetermined corridor within which the vehicle is to travel, the predetermined corridor having a first side and a second side; and
    an arrangement for detecting, after the travel envelope is generated, at least one of a position and a trajectory of the obstacle; and
    an arrangement for adapting, after the travel envelope is generated, the travel envelope by shifting at least one of the sides of the predetermined corridor of the travel envelope with the aid of the at least one of the position and the trajectory in order to one of avoid and mitigate the collision, wherein the adapting includes adapting the travel envelope within a traffic space, the traffic space including a traffic lane and an area that is detected as drivable in the step of detecting, and which goes beyond a boundary of the traffic lane that is facing away from the obstacle; and
    an arrangement for automatically controlling the vehicle in accordance with the adapted travel envelope.

13. A non-transitory storage medium storing a computer program product having program code that when executed on a device implements a method for one of avoiding and mitigating a collision of a vehicle with an obstacle in a traffic lane of the vehicle, the method comprising:
    generating, by a computing device, a planned travel envelope that represents a predetermined corridor within which the vehicle is to travel, the predetermined corridor having a first side and a second side; and after generating the travel envelope:
  detecting at least one of a position and a trajectory of the obstacle, and
  adapting the travel envelope by shifting at least one of the sides of the predetermined corridor of the travel envelope with the aid of the at least one of the position and the trajectory in order to one of avoid and mitigate the collision, wherein the step of adapting includes adapting the travel envelope within a traffic space, the traffic space including a traffic lane and an area that is detected as drivable in the step of detecting, and which goes beyond a boundary of the traffic lane that is facing away from the obstacle; and automatically controlling the vehicle in accordance with the adapted travel envelope.

* * * * *